US008066191B1

(12) United States Patent
Cloutier et al.

(10) Patent No.: US 8,066,191 B1
(45) Date of Patent: Nov. 29, 2011

(54) CARDS AND ASSEMBLIES WITH USER INTERFACES

(75) Inventors: Bruce S. Cloutier, Jeanette, PA (US); James H. Workley, Imperial, PA (US); William T. Shepherd, Callery, PA (US)

(73) Assignee: Dynamics Inc., Pittsburgh, PA (US)

( * ) Notice: Subject to any disclaimer, the term of this patent is extended or adjusted under 35 U.S.C. 154(b) by 0 days.

(21) Appl. No.: 12/710,315

(22) Filed: Feb. 22, 2010

Related U.S. Application Data

(60) Provisional application No. 60/166,909, filed on Apr. 6, 2009, provisional application No. 61/220,501, filed on Jun. 25, 2009, provisional application No. 61/234,406, filed on Aug. 17, 2009, provisional application No. 61/247,143, filed on Sep. 30, 2009.

(51) Int. Cl.
  *G06K 19/02* (2006.01)
(52) U.S. Cl. .................. 235/488; 235/380; 235/383
(58) Field of Classification Search .................. 235/488, 235/380, 383; 705/14
  See application file for complete search history.

(56) References Cited

U.S. PATENT DOCUMENTS

| 4,127,752 A | 11/1978 | Lowthorp |
| 4,349,712 A | 9/1982 | Michalski |
| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,771,139 A | 9/1988 | DeSmet |
| 4,786,791 A | 11/1988 | Hodama |
| 4,791,283 A | 12/1988 | Burkhardt |
| 4,797,542 A | 1/1989 | Hara |
| 4,876,441 A * | 10/1989 | Hara et al. ............ 235/488 |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |

(Continued)

FOREIGN PATENT DOCUMENTS

DE  EP0322515 A2 * 9/1988

(Continued)

OTHER PUBLICATIONS

The Bank Credit Card Business. Second Edition, American Bankers Association, Washington, D.C., 1996.

(Continued)

*Primary Examiner* — Allyson Trail

(57) ABSTRACT

Laminated cards with user interfaces are provided. The user interfaces can have enhanced tactile feel. In one embodiment, a card may be constructed to have a dual-layer user interface. In another embodiment, a card may be constructed to include a support structure. In yet another embodiment, a card may include a relatively soft material that covers at least a portion of the user interface. In yet another embodiment, a card may include a user interface that is fluidically coupled to a bladder. In a further embodiment, a card can include any combination of a user interface, which may be a dual-layer user interface, a support structure, a soft material that at least partially covers a user interface, and a bladder.

54 Claims, 16 Drawing Sheets

U.S. PATENT DOCUMENTS

| | | |
|---|---|---|
| 5,479,512 A | 12/1995 | Weiss |
| 5,484,997 A | 1/1996 | Haynes |
| 5,485,519 A | 1/1996 | Weiss |
| 5,561,278 A | 10/1996 | Rutten |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,627,355 A | 5/1997 | Rahman et al. |
| 5,657,388 A | 8/1997 | Weiss |
| 5,747,928 A | 5/1998 | Shanks et al. |
| 5,777,903 A | 7/1998 | Piosenka et al. |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,896,453 A | 4/1999 | Speaks |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Liu et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty et al. |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |

| | | |
|---|---|---|
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0131759 A1* | 6/2007 | Cox et al. .............. 235/380 |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0290049 A1 | 12/2007 | Ratcliffe |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0037275 A1* | 2/2009 | Pollio .............. 705/14 |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2011/0028184 A1 | 2/2011 | Cooper |

FOREIGN PATENT DOCUMENTS

| | | |
|---|---|---|
| JP | 05210770 A | 8/1993 |
| WO | WO9852735 | 11/1998 |
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

A Day in the Life of a Flux Reversal http://www.phrack.org/issues.html?issue=37&id=6#article. As viewed on Apr. 12, 2010.

Dynamic Virtual Credit Card Numbers. http://homes.cerias.purdue.edu/—jtli/paper/fc07.pdf. As viewed on Apr. 12, 2010.

English translation of JP 05210770 A.

U.S. Appl. No. 60/594,300, Poidomani et al.

U.S. Appl. No. 60/675,388, Poidomani et al.

* cited by examiner

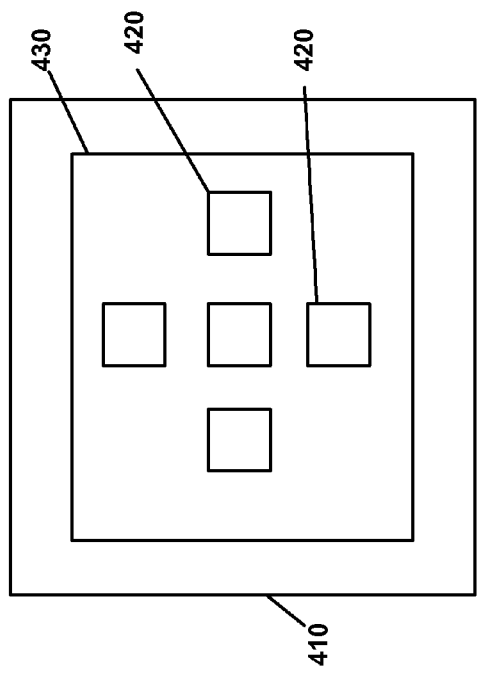
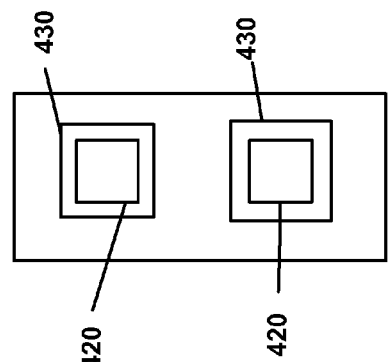
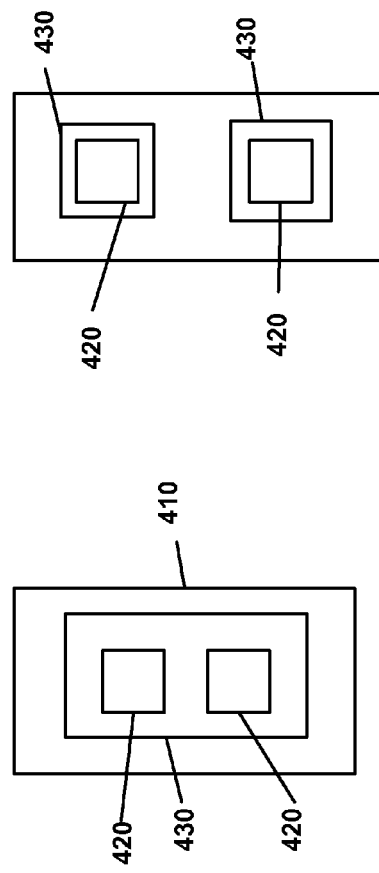

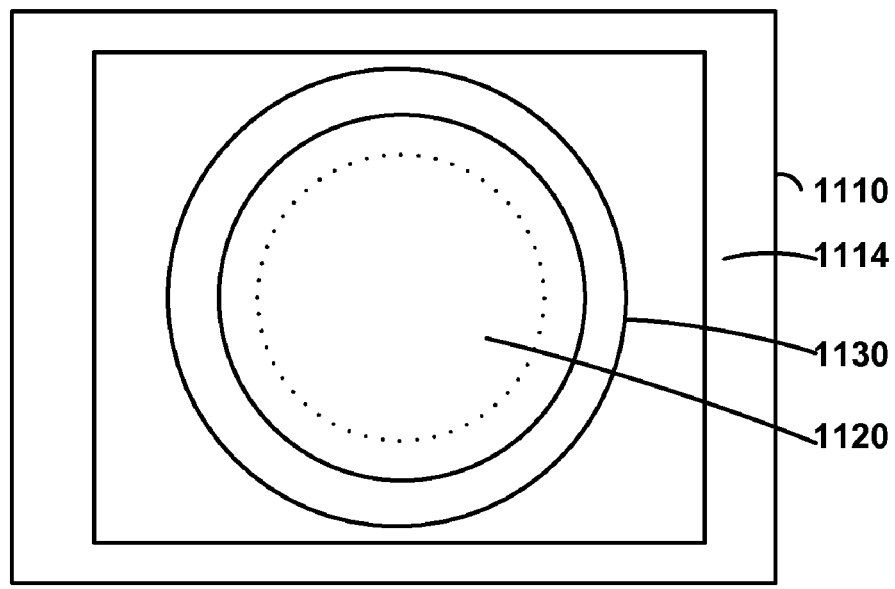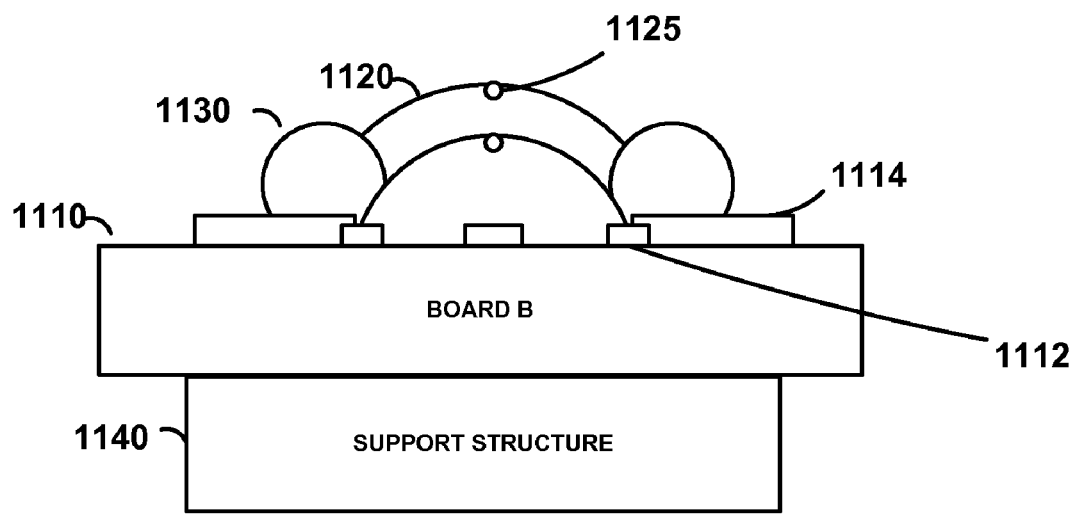
FIG. 11

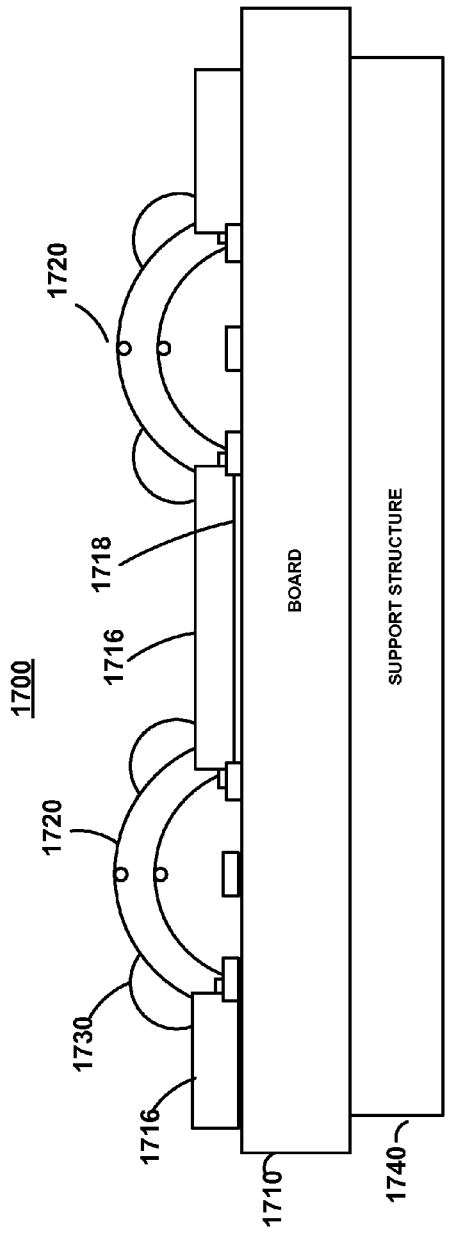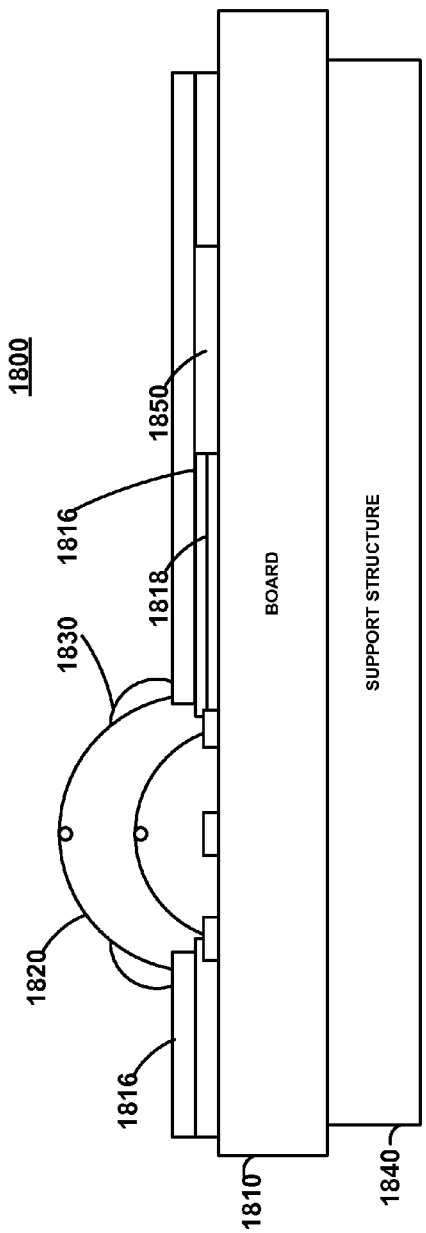

CARDS AND ASSEMBLIES WITH USER INTERFACES

CROSS-REFERENCE TO RELATED APPLICATIONS

This application claims the benefit of U.S. Provisional Patent Application Nos. 61/166,909 filed on Apr. 6, 2009, 61/220,501 filed on Jun. 25, 2009, 61/234,406 filed on Aug. 17, 2009, and 61/247,143 filed on Sep. 30, 2009, all of which are hereby incorporated by reference herein in their entirety.

BACKGROUND OF THE INVENTION

This relates to laminated cards with user interfaces.

Powered cards or electronic cards that include components such as a battery, a microprocessor, and other circuitry may be assembled to have similar dimensions to credit or debit cards or other cards which may include a magnetic stripe, for example. Some of these cards may include buttons, however if the cards are laminated, the buttons may not work reliably or may lack a tactile feel.

What is needed is a laminated card having at least one user interface that functions reliably and can provide a suitable tactile feel.

SUMMARY OF THE INVENTION

A laminated card or assembly having at least one user interface is provided. The user interface may be mounted on a circuit board such as a flexible printed circuit board. In one embodiment, the user interface may be a dual-layer user interface. The dual-layer user interface may include a first element mounted to a circuit board and has a portion operative to engage an electrical contact on the board during an input event. The dual-layer user interface may include a second element mounted to the board and is operative to engage a surface of the first element during the input event.

In another embodiment, a laminated card or an assembly may include a user interface that is supported by a structural support. The structural support may be mounted to a circuit board on the side opposite of the side to which the user interface is mounted. The structural support may mitigate deflection of the circuit board during the input event by distributing force applied thereto.

In another embodiment, a laminated card or an assembly may include a user interface that is at least partially covered by a material. This material may have a durometer value less than the durometer value of a lamination material (e.g., a material used during a lamination process) that may be fixed to the material that is at least partially covering the user interface. This permits the material to flex relative to the lamination material. For example, the material may buttress the user interface, yet yield to the lamination material during an input event, thereby enabling the lamination material to deflect the user interface.

In yet another embodiment a laminated card or an assembly may include a user interface and a bladder. The user interface and the bladder may be fluidically coupled such that, during an input event, gas displaced by the user interface is routed to the bladder. The bladder may be another user interface, a false user interface, a cavity disposed on the board, a cavity disposed in the structural support, or any other suitable structure.

In a further embodiment, a card can include any combination of a user interface, which may be a dual-layer user interface, a support structure, a durometer-specific material that at least partially covers a user interface, and a bladder. Any one of these combinations may also include an adhesive layer that covers the user interface. This adhesive layer may hold the user interface in place on the flexible circuit board. The adhesive layer may also provide an air-tight seal that prevents or substantially limits egress of any gas from the user interface during, for example, a lamination process. The adhesive layer may be a pressure sensitive adhesive that is UV or catalyst curable. In embodiments that have an adhesive layer and the durometer-specific material, the durometer-specific material may be fixed to a top surface of the adhesive layer.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIGS. 5A-C show illustrative top views of embodiments with differing user interface and support structure arrangements;

FIGS. 8-15 show illustration of different assemblies constructed for use in laminated cards in accordance with embodiments of the invention;

FIGS. 16-19 show illustrations of cards or assemblies including a user interface and a bladder in accordance with embodiments of the invention;

DETAILED DESCRIPTION OF THE INVENTION

Figure 1:
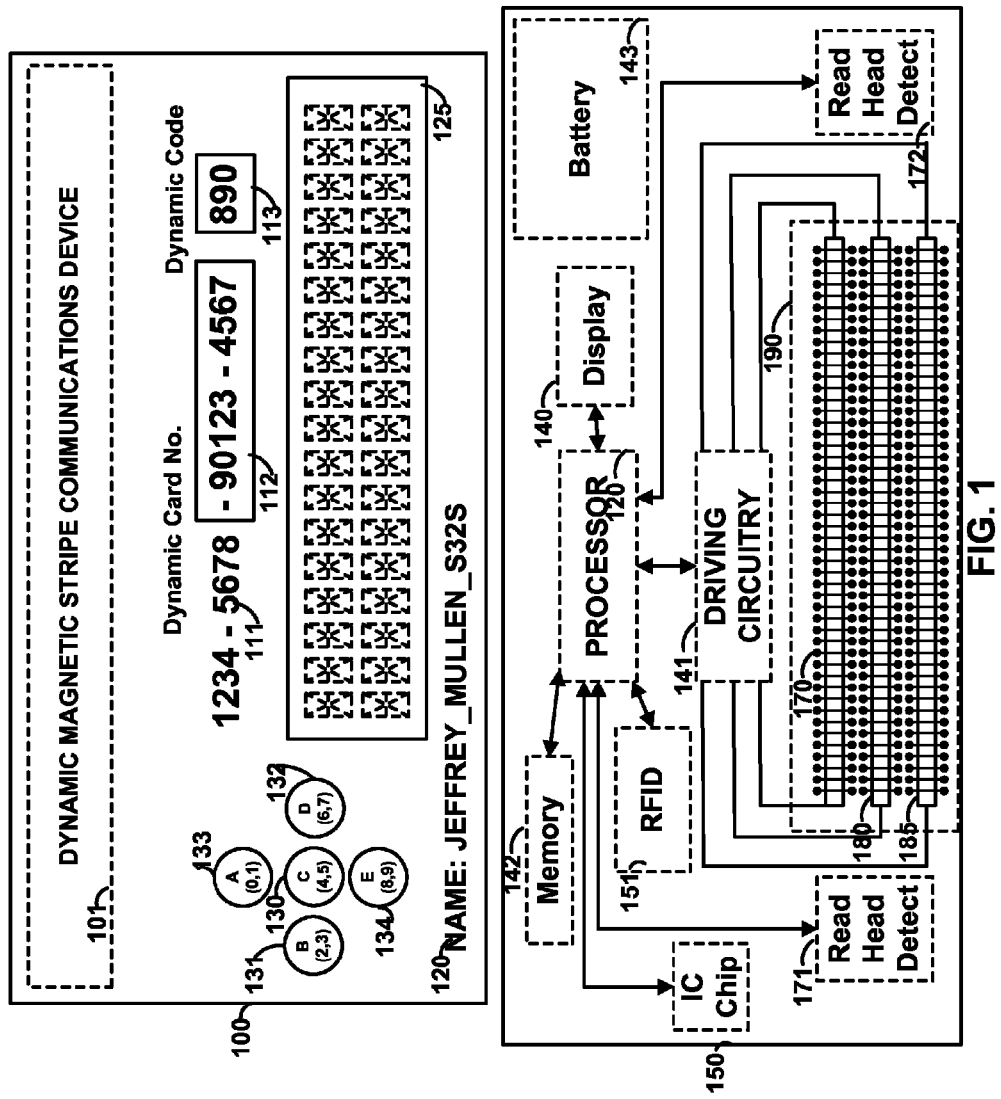
FIGS. 1-2 show illustrations of different card embodiments.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination or mechanical and capacitive buttons.

Architecture 150 may be utilized with any card. Architecture 150 may include processor 120. Processor 120 may have on-board memory for storing information (e.g., application code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data that is unique to a particular card.

Any number of reader communication devices may be included in architecture 150. For example, IC chip 150 may be included to communicate information to an IC chip reader. IC chip 150 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 150, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Figure 2:
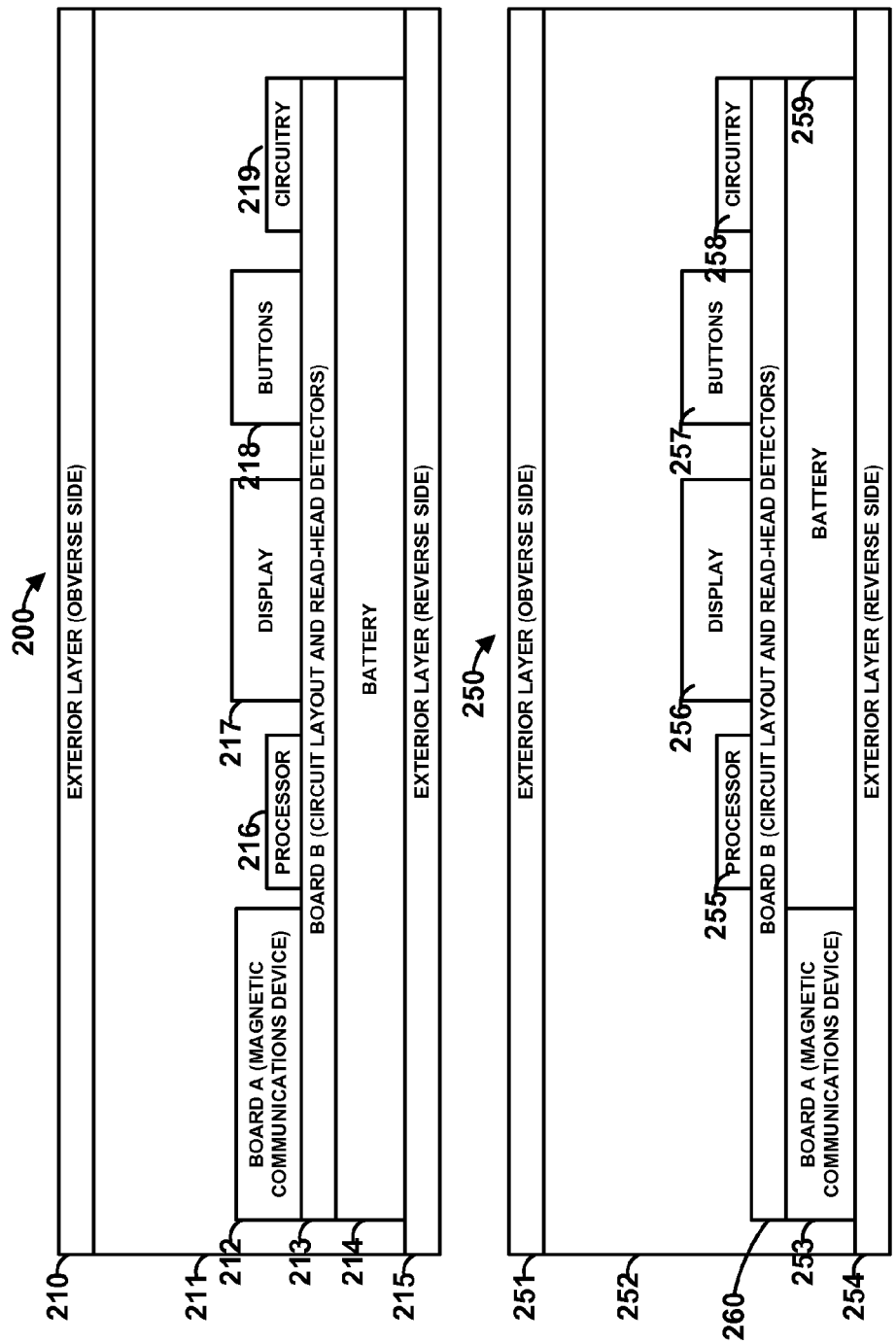

FIG. 2 shows illustrative cross-sectional view of card 200. Card 200 may be, for example, between 25 and 40 thousandths of an inch thick (e.g., approximately between 30 and 33 thousandths of an inch thick. Card 200 may include, for example, layer 210. Layer 210 may be a polymer, such as a polyethelene terephthalate. Similarly, layer 215 may be included as a polymer, such as polyethelene terephthalate. Layers 210 and 215 may be a laminate material or a composite laminate material. During construction of card 200, an electronics package circuitry (e.g., board 212, which may be a dynamic magnetic communications device, processor 216, display 217, buttons 218, additional circuitry 219, board 213, and battery 214) may be fixed (e.g., glued) to layer 215, material 211 may be injected onto the electronics circuitry package, and layer 210 may be applied to material 211. Material 211 may be formed from one or more polyurethane-based or silicon-based substances. Material 211 may be a substance that changes its physical state (e.g., changes from a liquid substance to a solid substance) when subjected to one or more predetermined conditions (e.g., heat, pressure, light, or a combination thereof) for a predetermined period of time.

To fabricate a card that is approximately 33 thousandths of an inch thick, for example, layers 215 and 210 may be approximately 5 to 7 thousandths of an inch thick (e.g., 5 thousandths of an inch thick). An electronics package may have a maximum thickness ranging between approximately 10-20 thousandths of an inch, between approximately 12-18 thousandths of an inch, between approximately 14-18 thousandths of an inch, or approximately 16 thousandths of an inch. Material 211 may have a thickness that ranges between approximately 1-16 thousands of an inch, between 3-10 thousands of an inch, or approximately 7 thousandths of an inch. The thickness of material 211 may vary depending on a height profile of the electronics package. Thus, for portions of the electronic package having a relatively tall height (e.g., 16 mils), the thickness of material 211 residing on that portion may be less thick that a portion of material 211 residing on a portion of the electronics package having relatively short height (e.g., 9 mils). The combined thickness of the electronic package and material 211 may range between approximately 8-26 mils, 14-24 mils, 16-23 mils, 18-22 mils, 20-23 mils, 16-20 mils, 19 mils, 20 mils, 21, mils, 22 mils, or 23 mils. If desired, a protective layer may be placed over layers 210 and 215. Such a protective layer may be between approximately 0.5 and 2 thousands of an inch thick or 1.5 thousandths of an inch thick.

In one embodiment, a card can be constructed so that the combined thickness of the electronics package and laminate 211 is approximately 21 mils and that the combined thickness of layers 210 and 215 is approximately 10 mils, resulting in a card having a thickness of approximately 31 mils. Persons skilled in the art will also appreciate that an injection molding process of a substance may allow that substance to fill into the groove and gaps of an electronics package such that the laminate may reside, for example, between components of an electronics package.

Card 200 may include an electronics package that includes, for example, board 212, which may be a dynamic magnetic communications device, processor 216, display 217, buttons 218, additional circuitry 219, board 213, and battery 214. Magnetic material may be, for example, provided as part of an assembled board 212 or fixed to the top of board 212. Board 213 may include, for example, capacitive read-head detectors placed about board 212. Battery 214 may be any type of battery, such as, for example, a flexible lithium polymer battery. Circuitry 219 may include, for example, one or more driver circuits (e.g., for a magnetic communications device), RFIDs, IC chips, light sensors and light receivers (e.g., for sending and communicating data via optical information signals), sound sensors and sound receivers, or any other component or circuitry for card 200.

Card 250 may be provided and may include, for example, exterior layers 251 and 254, board 253, board 260, processor 255, display 256, buttons 257, circuitry 258, and battery 259. Persons skilled in the art will appreciate that read-head detectors may be included, for example on board 253 or a different board (e.g., a board provided between board 253 and layer 254). Material 252 may be disposed between layers 251 and 254, covering the circuitry and permeating voids existing between circuit components.

Figure 3:
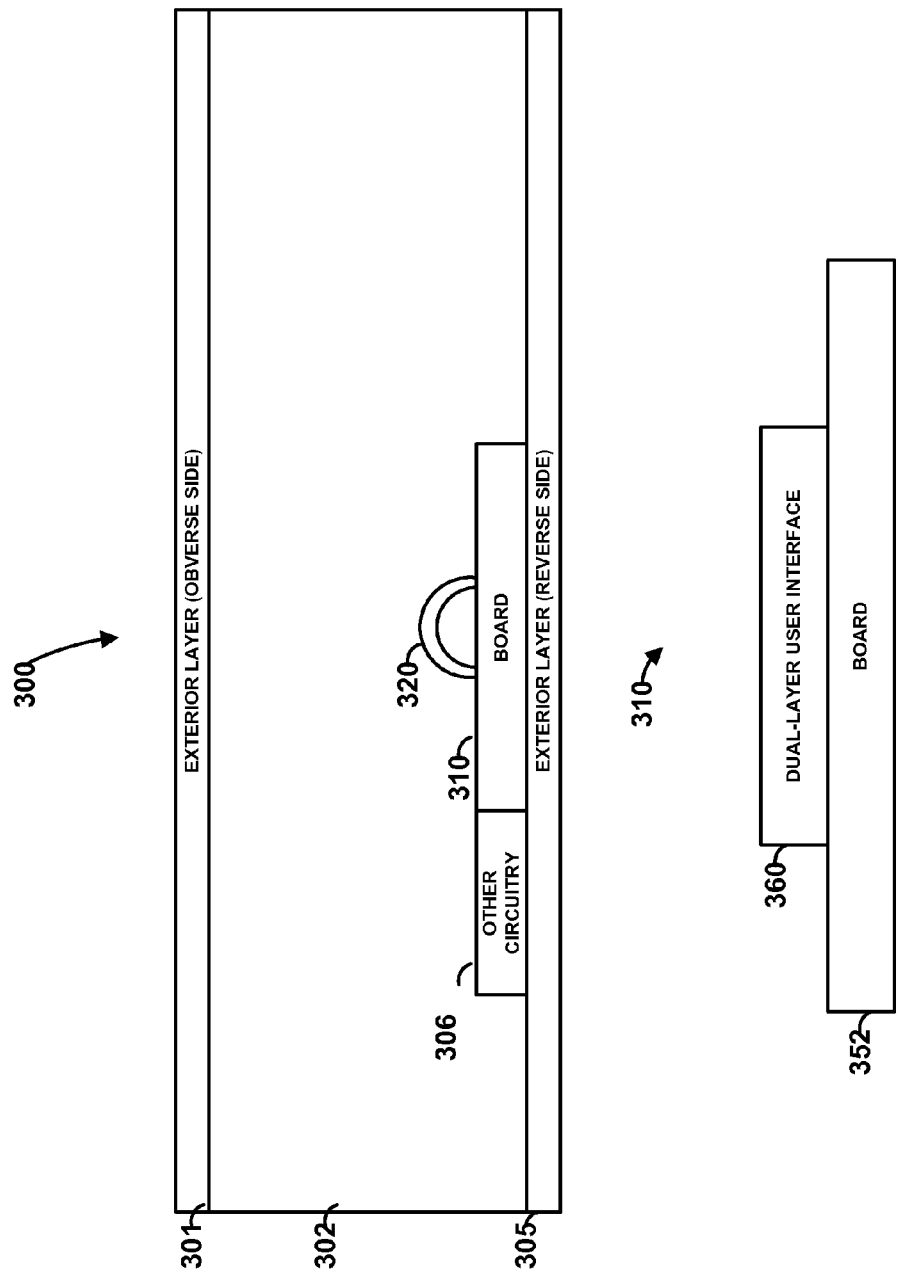
FIG. 3 shows illustrative cross-sectional views of embodiments including a dual-layer user interface.

FIG. 3 shows card 300, which may include layer 301, material 302, layer 305, other circuitry 306, board 310, and dual-layer user interface 320. Other circuitry 306 can represent, in the abstract, all other circuitry (e.g., display, processor, battery, etc.) that may be included in a card. An adhesive layer (not shown) may cover board 310 and user interface 320.

The adhesive layer is separate and distinct from material 302 and may be used to hold user interface 320 in place during a card lamination process. The adhesive layer may be a pressure sensitive adhesive that is UV or catalyst curable. The adhesive layer may prevent or at least substantially limit outgassing of any gas contained within user interface 320 when other circuitry 306, board 310, and user interface 320 are subjected to conditions (e.g., a lamination process) that may apply pressure thereto. Limiting or eliminating such outgassing may prevent formation of a vacuum, which if present, could adversely affect user interface performance. For example, presence of a vacuum could cause board 310 to flex up towards user interface 320. In addition, because the conditions that apply pressure to user interface 320 may cause it to deflect, the presence of a vacuum could also prevent user interface 320 from returning to a less deflected state.

Board 310 can be a flexible printed circuit board. Board 310 may have a thickness ranging between 0.5 and 3 Mils, or may have a thickness of 1 or 2 mils. The flexibility of board 310 may vary, yet exhibits flexibility sufficient for enabling card 300 to flex like a conventional credit card (i.e., a card having a conventional magnetic stripe). The composition of board 310 may vary. For example, in one embodiment, board 310 can be a Kevlar based flexible printed circuit board. In another embodiment, board 310 can be a conventional circuit board.

Board 310 may have mounted thereon dual-layer user interface 320. Dual-layer user interface 320 is operative to receive input events from a user (e.g., a pinch of fingers or a press of a finger). On receipt of an input event, a portion (e.g., an inner layer) of user interface element contacts a footprint or trace (not shown) on board 310.

Dual-layer user interface 320 can be constructed to have a variety of different shapes and construction configurations. Each configuration can include two layers: an inner layer and an outer layer. The inner layer may have a portion that is permanently electrically coupled to a footprint and another portion that engages a footprint in response to an input event. When the other portion engages the footprint, an electrical connection can be formed.

The outer layer may cover all or a portion of the surface of the inner layer. During an input event, a bottom surface of the outer layer may engage a top surface of the inner layer, causing the inner layer to depress and contact the footprint. A gap separation may exist between the inner and outer layers when in a relaxed state (i.e., not experiencing an input event). The gap separation may be such that the inner layer is permitted to jiggle and return to its relaxed state after an input event without touching the outer layer. In one embodiment, the gap separation may vary across a width of user interface 320. For example, the gap separation at the center may be maintained at a distance less than the gap separation at other locations. In another embodiment, the gap separation may be substantially uniform across the width. In another embodiment, the gap separation between the portion of the outer layer that interfaces with the inner layer during an input event may be maintained at a distance ranging between 0.25 to 1.25 mils, or about 1 mil.

An outer edge or edges of the outer layer may be mounted directly to board 310 or to a layer residing on top of board 310. In one embodiment, the outer edge or edges may extend beyond the edge or edges of the inner layer. In another embodiment, the outer edge or edges of the outer layer may coincide with the outer edge or edges of the inner layer.

In one embodiment, user interface 320 may include two dome switches both concentrically mounted about the same axis on board 310. The dome switches may have different dimensions. For example, the inner layer may have a smaller dimension (e.g., diameter) than the outer layer. Any suitably shaped dome switch may be used. For example, oblong, circle, triangle, or star shaped domes may be used.

During a lamination process such as a reaction in mold lamination process, material 302 is applied, under pressure, in a gaseous or liquid state and is later cured. The dual layer structure of user interface 320, particularly, the outer layer can mitigate application of pressure to user interface 320 during the card lamination process. This may serve to maintain a tactile feel during user input events and can better enable user interface to function properly and reliably. By way of comparison, a single layer user interface can be crushed or substantially flattened under the pressure during the lamination process, and thus is unable to yield a tactile feel, and in some cases, renders the user interface inoperable.

Assembly 310 of FIG. 3 shows a cross-sectional view of a user interface assembly. Assembly 310 may include board 352 and dual-layer user interface 360. An adhesive (not shown) may be provided to hold user interface 360 in place. Assembly 310 may be assembled as a subassembly for later inclusion in a card. For example, assembly 310 may be manufactured at a first facility and shipped to a second facility where it can be used as a part in a card assembly line.

Dual-layer user interface 360 may be any dual layer structure operative to receive and register an input event. User interface 360 may embody aspects of user interface 320, discussed above, or aspects of other user interfaces discussed herein.

Figure 4:
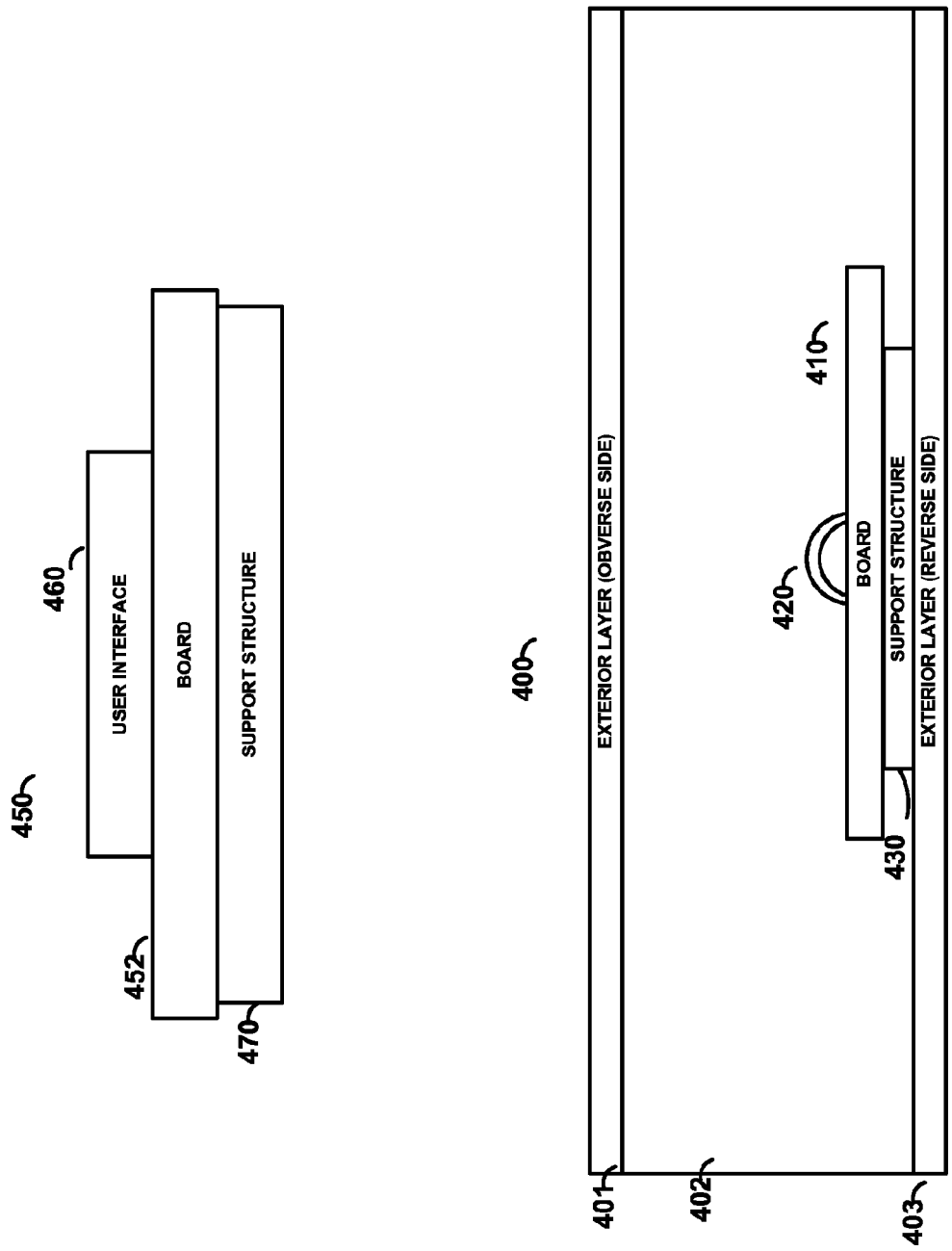
FIG. 4 shows illustrative cross-sectional views of embodiments including a support structure.

FIG. 4 shows a cross-sectional view of card 400. Card 400 can include layer 401, material 402, layer 403, board 410, user interface 420, and support structure 430. Card 400 may be similar to card 300 of FIG. 3, except for the addition of support structure 430. Moreover, an adhesive layer, similar to the adhesive layer discussed above, may be provided to cover user interface 420 and at least a portion of board 410. Support structure 430 may be affixed to a bottom surface of board 410. Support structure 430 may be constructed from a material having sufficient structural strength to distribute force applied thereto to prevent substantial deflection of board 410 or to at least mitigate deflection of board 410. Preventing or mitigating deflection of board 410 further promotes a tactile feel of user interface 420 during an input event. In one embodiment, support structure 430 may be a metal (e.g., steel, aluminum, or alloy) plate. In another embodiment, support structure 430 may be a non-magnetic material such as carbon fiber, plastic, or glass.

Support structure 430 may be sized according to any suitable dimension. For example, support structure 430 may be sized to cover a portion or the entirety of the bottom surface of board 410. As another example, support structure may exceed the area of board 410. As yet another example, support structure 430 may be sized to occupy an area similar to, or slightly larger than, the area occupied by user interface 420. In some embodiments, where multiple user interfaces are provided, multiple support structures 430 may adhere to board 410. If desired, each of those support structures 430 may be sized for each user interface, as illustrated in FIG. 5A. Alternatively, those support structures 430 may be sized to cover all the user interfaces, as illustrated in FIGS. 5B and 5C.

Support structure 430 may have a thickness ranging between 0.25 to 4 mils or between 1 to 3 mils. In some embodiments, support structure 430 may have a thickness of about 1 mil, about 1.25 mils, about 1.5 mils, about 2 mils, or about 3 mils.

Referring back to FIG. 4, an illustrative cross-sectional view of assembly 450 is provided. Assembly 450, similar to assembly 310 (of FIG. 3) may be a stand-alone sub-assembly that may be later incorporated into a card during, for example, a final card assembly step. Assembly 450 can include board 452, user interface element 460, and support structure 470. An adhesive layer (not shown) may also be included. Board 410 may be any suitable flexible circuit board. User interface 460 may be a dual layer user interface such as those discussed herein or a single layer user interface (e.g., a dome switch). Support structure 470 may be any suitable support structure such as those discussed herein.

Figure 6:
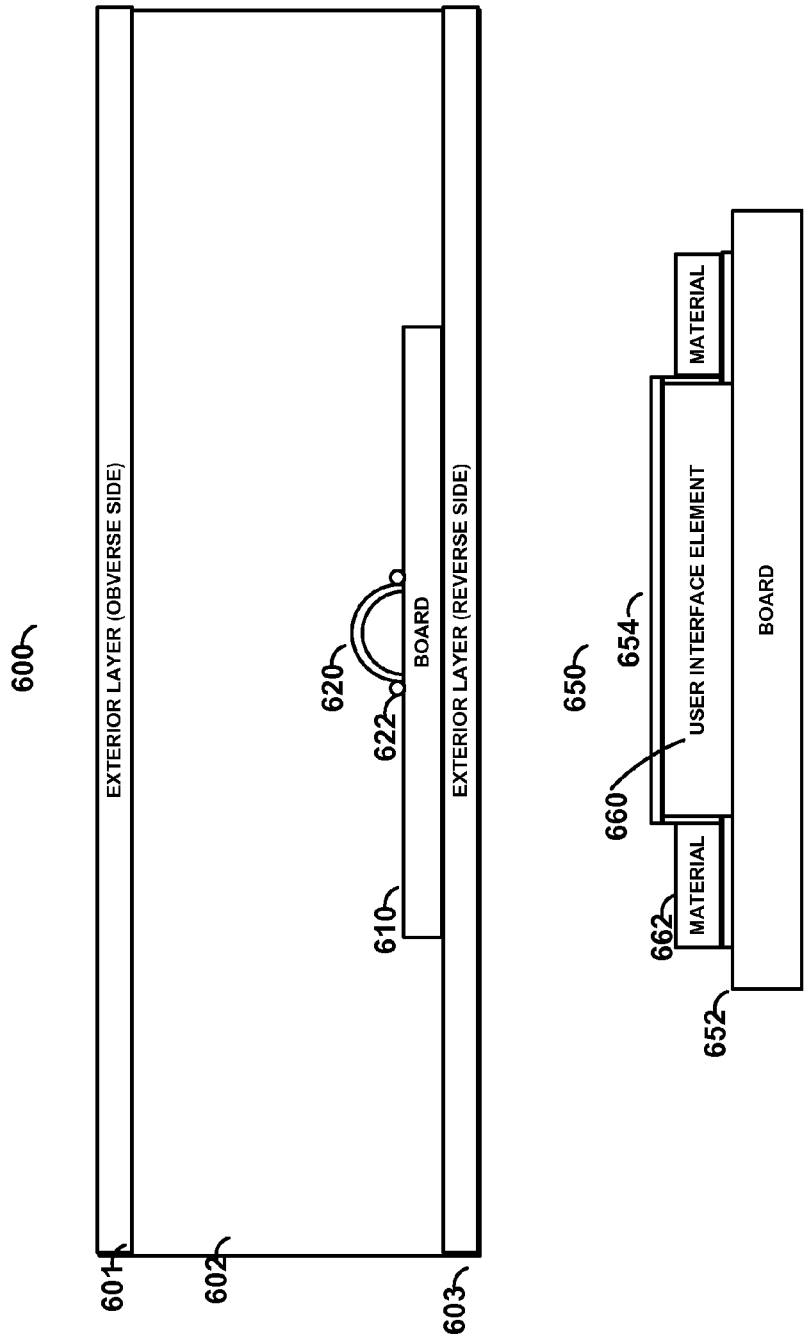
FIG. 6 shows illustrative cross-sectional views of embodiments including a user interface and a material that at least partially covers the user interface.

FIG. 6 shows an illustrative cross-sectional view of card 600. Card 600 can include layer 601, material 602, layer 603, board 610, user interface 620, and material 622. An adhesive layer (not shown) may also be included and may cover user interface 620 and at least a portion of board 610. Material 622 may be disposed on top of the adhesive layer (not shown). Board 610 may be a flexible printed circuit board such as those discussed herein. User interface 620 may be a single or dual layer user interface.

Material 622 can be any suitable material that covers at least a portion of user interface 620. If the adhesive layer is present, material 622 may adhere direct to that layer. If not present, material 622 may directly adhere to user interface 620.

Material 622 may be a polyurethane based material or a silicone based material. In some embodiments, material 622 may cover user interface 620 and board 610, or any other suitable structure. Material 622 may be disposed such that it circumvents and partially covers user interface 620, thereby exposing the uncovered adhesive portion to direct contact with material 602. In another embodiment, material 622 may entirely encapsulate user interface 620 such that material 602 does not directly contact the adhesive layer covering user interface 620. Several different arrangements of material 622 are shown in FIGS. 8-15.

Material 622 can promote the tactile feel of an input event. Material 622 may buttress user interface 620. For example, material 622 may provide sidewall support that limits lateral movement and promotes vertical movement of user interface 620. In one embodiment, for example, during an input event, deflection of user interface 620 is concentrated in the portion (of interface 620) that is not covered by material 622. Thus, the portion of user interface 620 that is more closely connected to material 602 may be more susceptible to deflection or vertical movement than those portions less closely connected with material 602, as material 622 is buttressing those portions it is covering. Accordingly, by concentrating deflection, the tactile feel of user interface 620 may be improved.

Material 622 may have a predetermined durometer that is different than the durometer of other materials (e.g., material 602) in card 600. Durometer is a measure of the hardness of a material. For example, in one embodiment, the durometer of material 622 is less than the durometer of material 602. In this embodiment, material 622 may yield to material 602 during an input event. The difference in hardness between materials 602 and 622 can promote the tactile feel of an input event. In one embodiment, material 622 may have durometer value according to the A scale.

Assembly 650, which is shown as a cross-sectional view is provided in FIG. 6. Assembly 650 may be a stand-alone sub-assembly that may be later incorporated into a card during, for example, a final card assembly step. Assembly 650 can include board 652, adhesive layer 654, user interface 660, and material 662. Board 652 may be any suitable flexible circuit board. Adhesive layer 652 may cover user interface 660 and a portion of, or all of, board 610. User interface 660 may be a dual layer user interface such as those discussed herein or a single layer user interface (e.g., a dome switch). Material 662 may cover at least a portion of user interface 660, and for those portions it cover, it may adhere to the adhesive layer.

Figure 7:
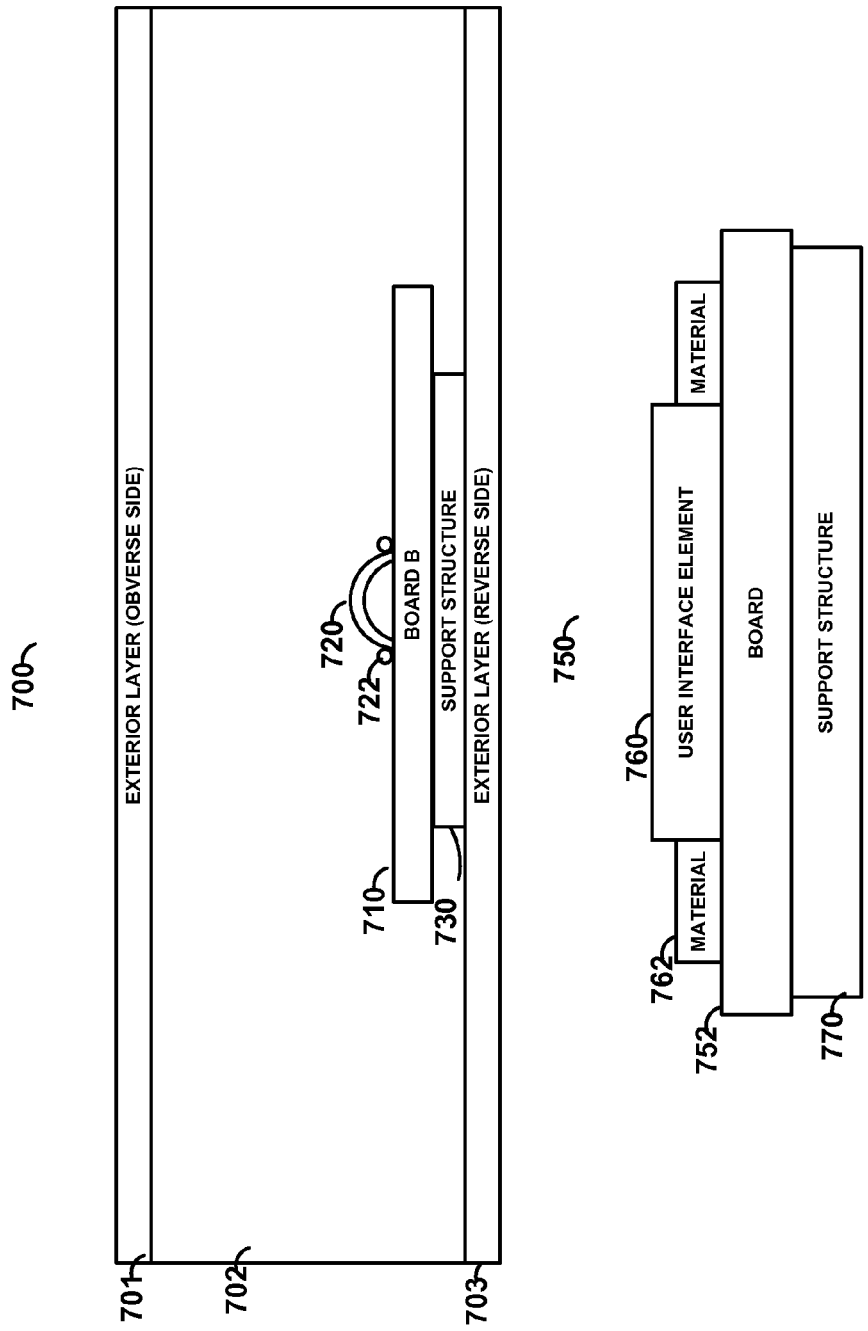
FIG. 7 shows illustrative cross-sectional views of embodiments including a user interface, a support structure, and a material that at least partially covers the user interface.

FIG. 7 shows an illustrative cross-sectional view of card 700. Card 700 can include layer 701, material 702, layer 703, board 710, user interface 720, material 722, an adhesive layer (not shown), and support structure 730. Card 700 can include all the elements of card 600 (of FIG. 6) with the addition of support structure 730. Thus, card 700 benefits from the advantages provided by both material 722 and support structure 730. User interface 720 can be a single or dual layer user interface.

FIG. 7 also shows illustrative cross-sectional view of assembly 750. Assembly 750 can be a sub-assembly that can be used as a part in assembling a card such as card 700. Assembly 750 can include board 752, adhesive layer (not shown), user interface 760, material 762, and support structure 770.

FIGS. 8-15 show many different user interface and material configurations that may be constructed for use in a card. Each embodiment shown in FIGS. 8-15 includes a board, a user interface, and material (e.g., user interface support material). Support structures, if included, are optional. None of FIGS. 8-15 show an adhesive layer, but such an adhesive layer may exist, and such adhesive layer may completely cover the user interface(s) and at least a portion of the board. It is understood that if any material (i.e., user interface buttressing material) is present, it covers the adhesive.

Figure 8:
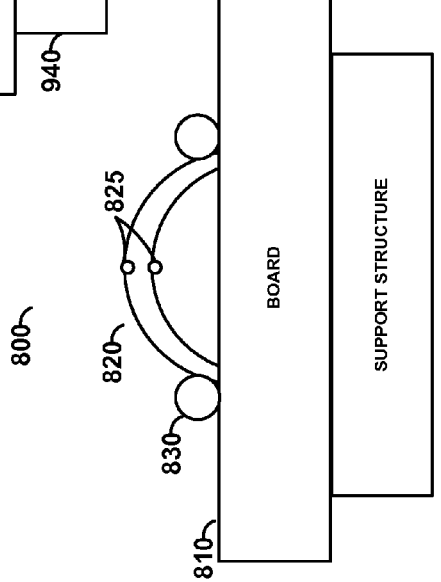

FIG. 8 shows an assembly 800 including a dual-layer user interface 820 partially supported by material 830. User interface 820 may include force concentration structures 825. Force concentration structures 825 may be operable to concentrate application of an applied force to respective predetermined locations. As shown, upper structure 825 may apply a concentrated force to the inner layer of user interface 820 and lower structure 825 may apply a concentrated force to board 810. In some embodiments, both layers of user interface 820 may include a force concentration structure. In other embodiments, only one of the layers may include a force concentration structure. For example, the outer layer may include a force concentration structure, whereas the inner layer may not. In another example, the inner layer may include a force concentration structure, and the outer layer may not.

Force concentration structure 825 may be provided in any suitable shape. For example, the structure may have a pointed tip, wedge-shaped tip, or a rounded tip that protrudes from a layer of user interface 820. Force concentration structure 825 may be integrated with a layer of user interface 820. The shape of a force concentration structure for an inner layer may be different than a force concentration structure for an outer layer of user interface 820. Force concentration structure 825 may be constructed from the same material as a layer of user interface 820, or may be electrically conductive.

Force concentration structure 825 may be constructed to provide a predetermined gap separation between the outer and inner layers when user interface 820 is in a relaxed state. In some embodiments, the gap separation that exists between the portions of the inner and outer layers that interface with each other during an input event may require a relatively tight tolerance. Force concentration structure 825 may assist in meeting that tolerance.

Figure 9:
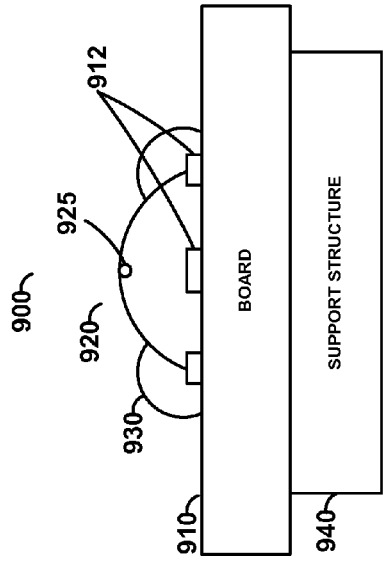

FIG. 9 shows an assembly 900 that can include board 910, user interface 920, which has incorporated therein force concentration structure 925, material 930, and support structure 940. Assembly 900 can further include footprints 912, which are provided on board 910. Footprints 912 may be traces printed or etched into board 910. In embodiments in which user interface 920 resembles or is a dome switch, footprints 912 may have inner and outer footprints. As such, the edge of user interface 920 may be electrically coupled to the outer footprint. During an input event, force concentration structure 925 may form an electrical connection with the inner footprint.

As shown in FIG. 9, user interface 920 is a single layer user interface. Material 930 covers a portion of the outer surface of user interface 920 and a portion of board 910.

Figure 10:
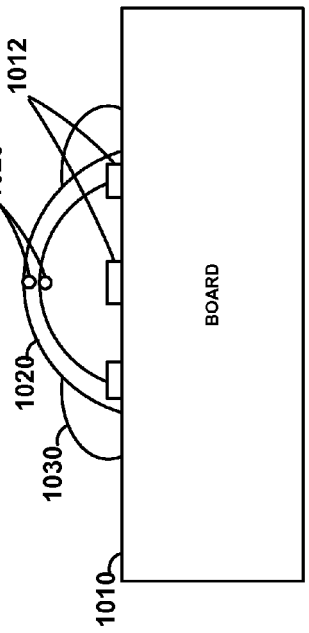

FIG. 10 shows assembly 1000 that can include board 1010, footprints 1012, user interface 1020, which includes force concentration structures 1025, and material 1030. User interface 1020 is a dual-layer user interface. In this embodiment, the outer layer extends beyond the outer footprint 1012, as shown. Material 1030 can cover a portion of the outer layer of user interface 1020 and a portion of board 1010. In embodiments where both layers are mounted to the same plane (e.g., top surface of board 1010) or substantially co-planer planes, the outer layer may have a larger dimension (e.g., radial dimension) than the inner layer.

FIG. 11 shows illustrative top and cross-sectional views of assembly 1100. Assembly 1100 can include board 1110, footprints 1112, user interface 1120, with force concentration structures 1125, material 1130, and support structure 1140. Assembly 1100 may further include step structure 1114 provided on board 1110. An adhesive layer (not shown) may cover user interface 1120 and step structure 1114. Step structure 1114 may raise the outer layer of user interface 1120 a predetermined height relative to the inner layer. In addition, step structure 1114 may assist in securing the inner layer in place on board 1110. Material 1130 may adhere to the outer layer of user interface 1120 and step structure 1114. In some embodiments, material 1130 may adhere to the outer layer, step structure 1114, and board 1110.

Step structure 1114 may be constructed from any suitable material. For example, step structure 1114 may be a polyurethane material, an injected molded plastic, or a polyester material.

The top view shows step structure 1114 disposed on board 1110 and that material 1130 is disposed as a ring around the outer layer of user interface 1120. The inner layer is shown with hidden lines.

Figure 12:
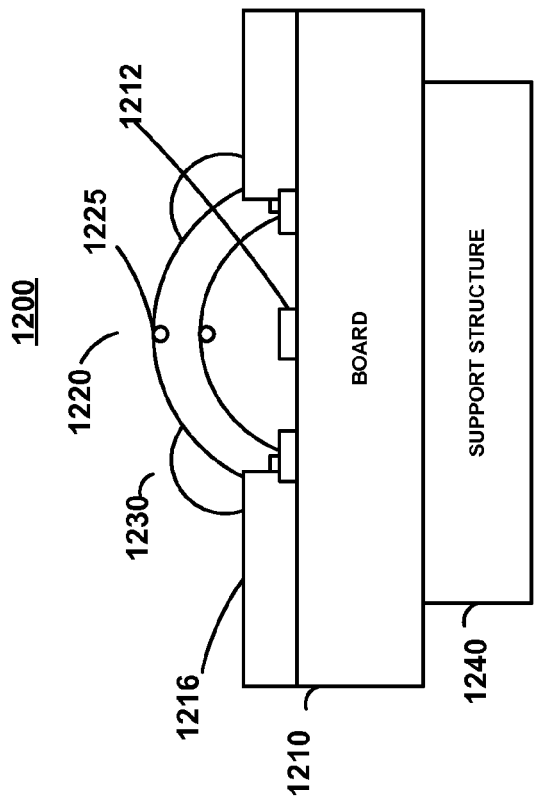

FIG. 12 shows assembly 1200 that can include board 1210, footprints 1212, dual layer user interface 1220, with force concentration structures 1225, material 1230, and support structure 1240. Assembly 1200 may also include multi-tiered step structure 1216. An adhesive layer (not shown) may cover user interface 1220 and step structure 1216. Step structure 1216 may include at least two tiers. These tiers may be called a bottom tier and a top tier. The top tier may raise the outer layer of user interface 1220 a predetermined height relative to the inner layer. The bottom tier may be used to assist in securing the inner layer of user interface 1220 in place. Material 1230 may cover the outer layer of user interface 1220 and the top tier of tier structure 1216.

Figure 13:
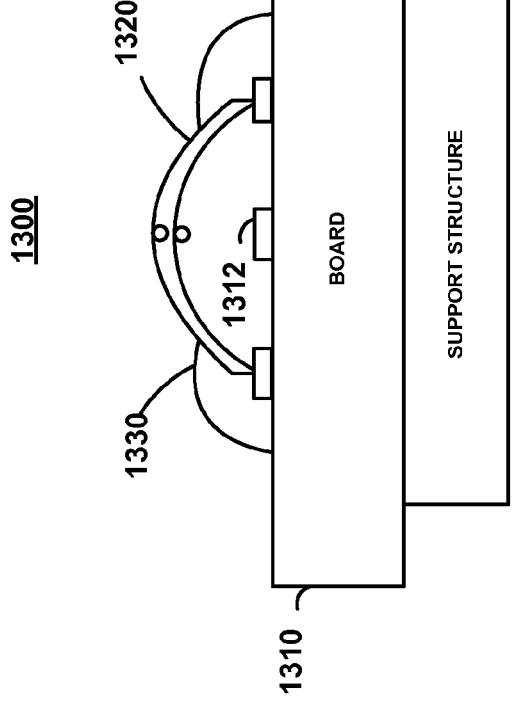

FIG. 13 shows assembly 1300 that can include integrated dual-layer user interface 1320. Integrated dual-layer user interface 1320 combines both the inner and outer layers in a single integrated component. This eliminates a need for step structures or differently sized layers in order to maintain a desired gap separation between the layers. User interface 1320 may include one or two force concentration structures. The outer and inner layers may be coupled together, for example, at the edge, which may be mounted to footprint 1312. Material 1330 may adhere to user interface 1320 and board 1310.

Figure 14:
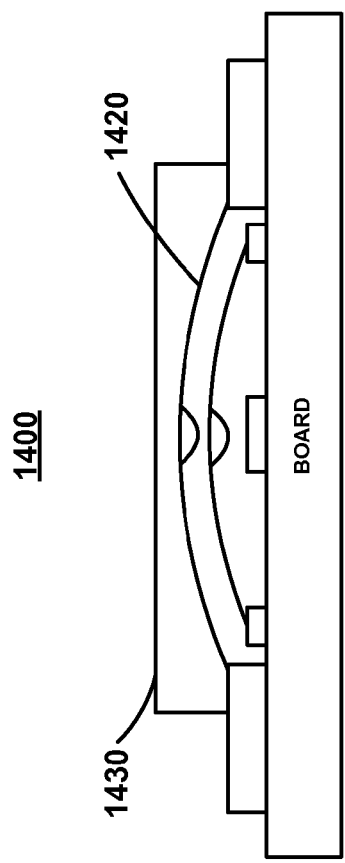
Figure 15:
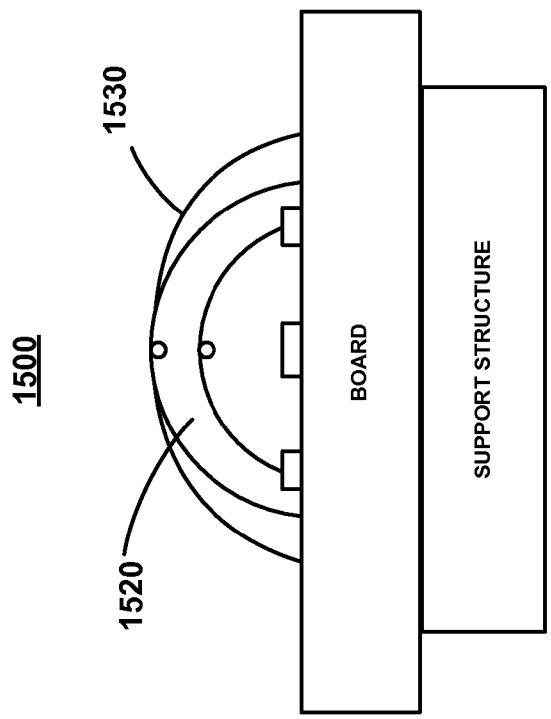

FIG. 14 shows assembly 1400 that can include user interface 1420 that is completely covered by material 1430. FIG. 15 shows assembly 1500 that can include user interface 1520 that is substantially covered by material 1530, however leaves a relatively small portion of user interface 1520 exposed. FIGS. 14 and 15 illustrate that material coverage of the user interface may vary (e.g., from minimal encapsulation to full encapsulation).

In some embodiments, the material composition may vary. For example, the material may include materials having two different durometer values, both of which may be less than the durometer value of other material (e.g., lamination adhesive) in the card.

User interfaces incorporated into cards may be contained in a closed system that does not vent to atmosphere or the ambient environment. Thus, in such a card, when a user interface is depressed, gas contained in or about the interface may be displaced. Absent any relief for the displaced gas, the tactile feel may be muted or the user interface may not function as desired. Incorporation of a bladder may provide relief for the gas. FIGS. 16-20 show different illustrative embodiments having a bladder for receiving gas displaced by a user interface during an input event.

Figure 16:
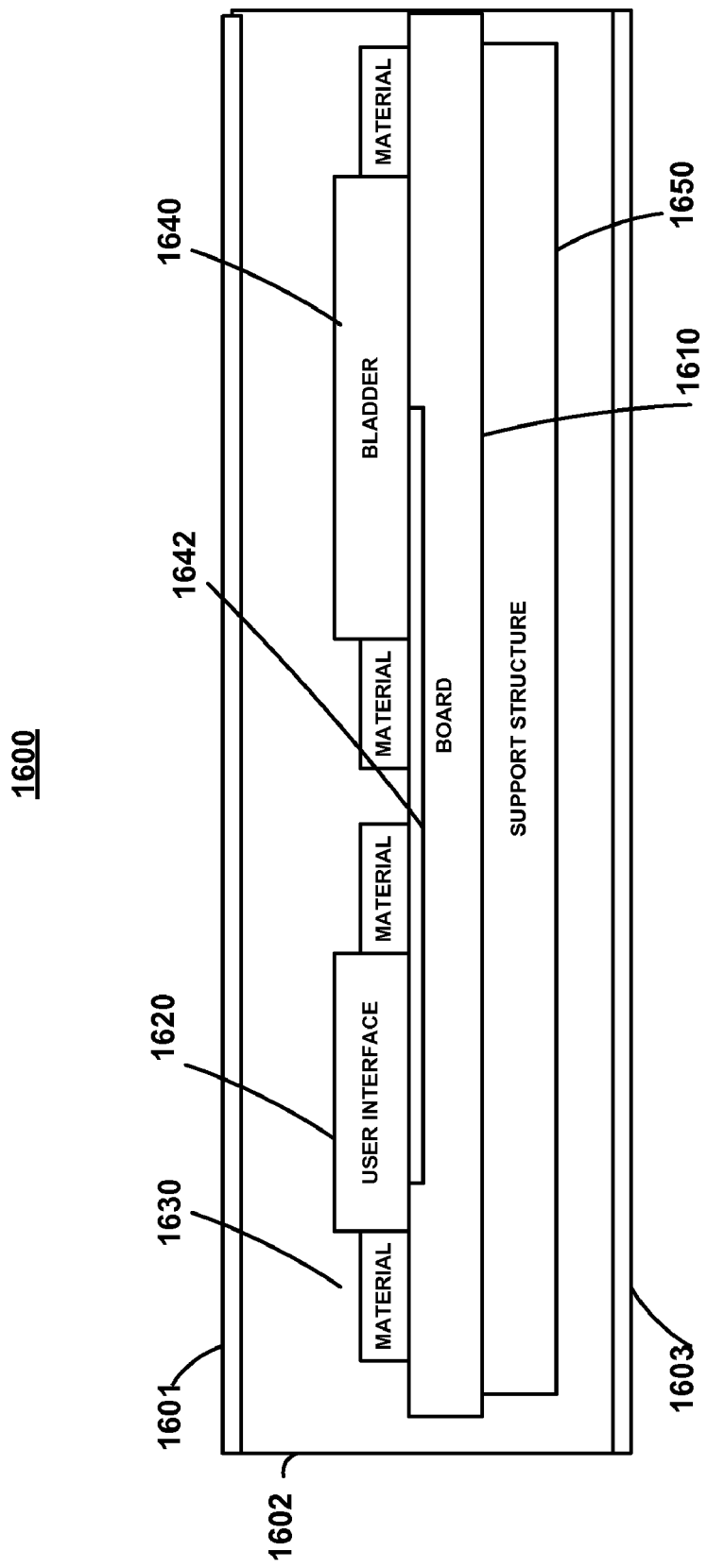

FIG. 16 shows a cross-sectional view of card 1600 having a bladder. Card 1600 can include layer 1601, material 1602, layer 1603, board 1610, user interface 1620, material 1630, bladder 1640, and support structure 1650. Other circuitry and components may be included, but are not shown to avoid overcrowding the drawing. For example, an adhesive layer may be provided. Card 1600 may be a closed system that prohibits ingress of any substance (e.g. gas or liquid) from outside of the card and egress of any substance (e.g., gas) to the environment outside the card.

User interface 1620 and bladder 1640 may be fluidically coupled via conduit 1642. When user interface 1620 is depressed, gas displaced by the depression may be routed to bladder 1640 via conduit 1642. Conduit 1642 may be any suitable structure or channel operative to channel gas. For example, conduit 1642 may be etched into board 1610. As another example, conduit 1642 may be a channel existing in board 1610. The channel may cut through the entire thickness of board 1610, however, support structure 1650 may provide the seal closes the channel, and thereby forms conduit 1642. As another example, conduit 1642 may be a channel existing within a layer of material (not shown) residing on board 1610. Yet another example, conduit 1642 may be a via or a tube.

Bladder 1640 may be any suitable structure operative to receive gas. For example, bladder 1640 may be a cavity. The cavity may be constructed during a lamination process. As another example, bladder 1640 may be another user interface. As yet another example, bladder 1640 may be a false user interface (i.e., a structure set up to potentially receive a user interface, but the user interface is not provided).

FIG. 17 shows an illustrative cross-sectional view of assembly 1700. Assembly 1700 can include board 1710, multi-tier step structure 1716, dual-layer user interfaces 1720, material 1730, and structural support 1740. Conduit 1718 is provided within multi-tier step structure 1716 and fluidically couples both user interfaces 1720. Thus, one of user interfaces 1720 may serve as a bladder for the other user interface 1720 during an input event. Although only two user interfaces are shown fluidically coupled to each other, it is understood that every user interface may be fluidically coupled to each other.

FIG. 18 shows an illustrative cross-sectional view of assembly 1800. Assembly 1800 can include board 1810, multi-tier step structure 1816, dual-layer user interface 1820, material 1830, structural support 1840, and bladder 1850. Multi-tier step structure 1816 may have bottom and top tiers. The top tier of structure 1816 may cover bladder 1850, and the bottom tier may abut bladder 1850. Conduit 1818 is provided within multi-tier step structure 1816 and fluidically couples user interface 1820 and bladder 1850. The size of bladder 1850 may be sized to accommodate gas displacement from one or more user interfaces. For example, in some embodiments, two or more user interfaces may be depressed simultaneously during an input event.

Figure 19:
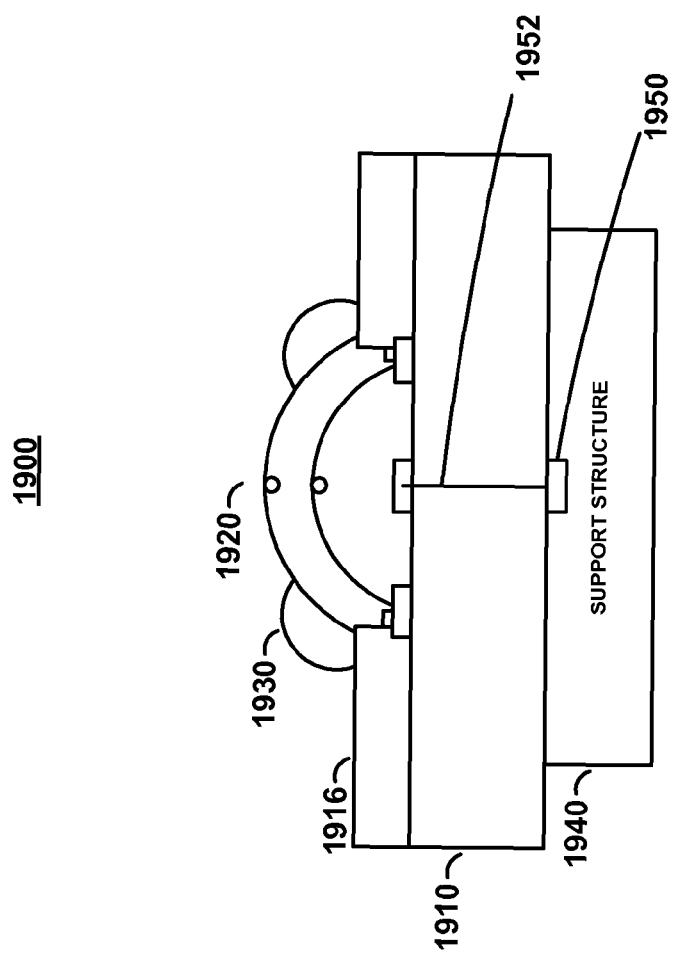

FIG. 19 shows an illustrative cross-sectional view of assembly 1900. Assembly 1900 can include board 1910, step structure 1916, user interface 1920, material 1930, structural support 1940, bladder 1950, and conduit 1952, which fluidically couples user interface 1920 to bladder 1950. Bladder 1950 may be contained within structural support 1940. Structural support 1940 may be constructed to have a cavity, and when it is attached to the underside of board 1910, bladder 1950 is provided. In another approach, structural support 1940 may be constructed to have a through-hole, and when it is attached to board 1910 and its bottom side is covered, for example, with a laminate material, bladder 1950 may be provided.

In some embodiments, each user interface may be associated with its own bladder. In another embodiment, a common bladder may be shared among all user interfaces.

Figure 20:
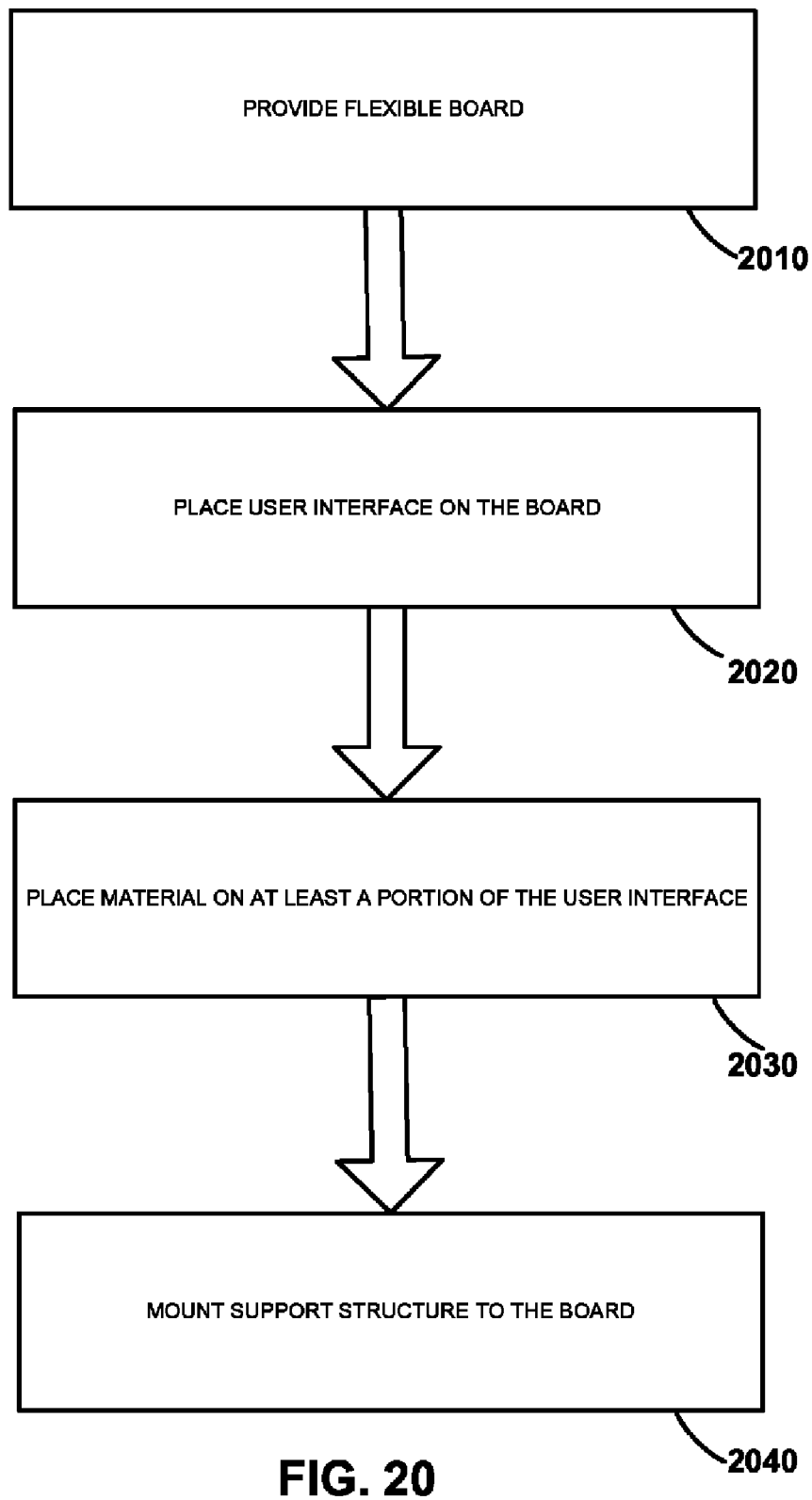
FIG. 20 is a flowchart illustrating steps for constructing embodiments of the invention.

FIG. 20 shows illustrative steps for making an assembly or a card. Beginning with step 2010, a board is provided. The board may be a flexible printed circuit board. At step 2020, at least one user interface is mounted to the board. The user interface can be a single layer or a dual layer user interface. At step 2030, a material may be disposed adjacent to the at least one user interface. The degree to which the material covers each user interface may vary. For example, the user interface may be completely covered or partially covered. At step 2040, a support structure may be mounted to the board.

The order of the steps presented in FIG. 20 are merely illustrative and may be performed in any suitable order. For example, the support structure may be mounted to the board prior to the at least one user interface. In addition, additional steps may be added, and steps may be omitted. For example, the structural support mounting step may be omitted. An additional step of placing an adhesive over the board, user interface, and material may be provided to hold the assembly together.

After the assembly is created, it may be used as a component or sub-assembly in a card. A card assembler may use the assembly to provide a pre-lamination card package. The pre-lamination card package may include all the components of a card (e.g., such as the components shown and discussed in connection with FIG. 1). It is understood that the pre-lamination card package may be assembled with or without the assembly. If desired, the components of the assembly may be assembled directly into a card package.

The pre-lamination card package may be laminated in a lamination process. The lamination process may be any suitable lamination process. The process can result in a card having the pre-lamination card package and an encapsulating material sandwiched between layers of material (e.g., a polymer sheet). For example, a reaction in mold lamination process may be used. One variant of such a process can include a continuous roll lamination process, an example of which is described in U.S. provisional patent application No. 61/234,406, filed Aug. 17, 2009, which is incorporated by reference herein in its entirety. Another variant can include a batch process roll lamination process.

Figure 21:
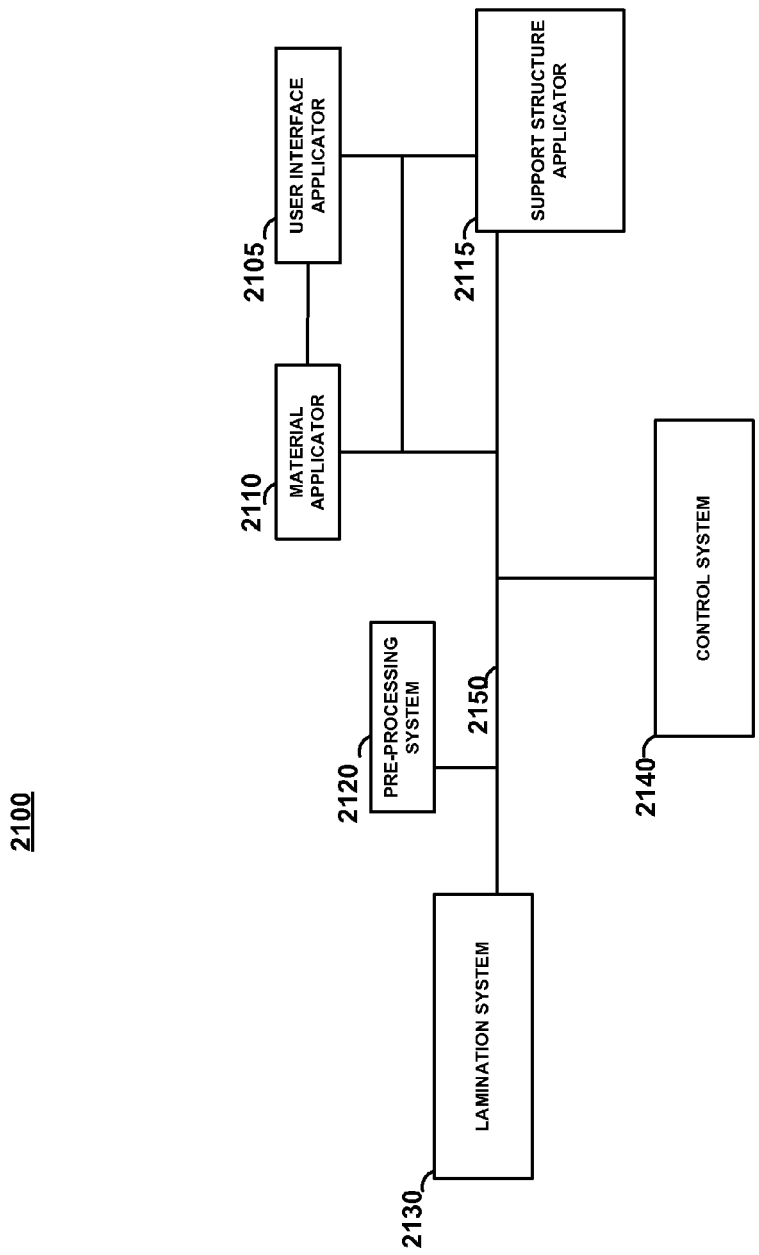
FIG. 21 is an illustrative block diagram of a system for constructing embodiments of the invention.

FIG. 21 is an illustrative block diagram of a system 2100 according to an embodiment of the invention. System 2100 can include any combination of the subsystems, the selective combination of which can operate in concert to produce laminated cards having buttons or assemblies for incorporation into cards. System 2100 can include user interface applicator 2105 (e.g., for applying one or more user interfaces to a board), material applicator 2110 (e.g., for applying a material to at least a portion of a user interface), structural support applicator 2115, one or more pre-processing stations 2120 (e.g., for assembling pre-lamination card packages), lamination system 2130 (e.g., for laminating a pre-lamination card package), and control system 2140. Control system 2140 may serve as a master control system that controls and monitors the operation of one or more or all subsystems. Some subsystems such as, for example, pre-processing stations 2120 and lamination system 2130 may include their own respective control systems to perform their respective operations, but may coordinate operations with other subsystems by communicating via control system 2130 or directly with each other.

Control system 2140 may communicate with the various subsystems using communications paths 2150. Communications paths 2150 may be bi-directional communications paths. Communications paths 2150 may also enable subsystem to subsystem communications.

System 2100 may be split up and performed at different facilities. For example, lamination system 2130 and pre-processing system 2120 may be operated in their own respective facilities apart from the other subsystems shown in FIG. 21.

Persons skilled in the art will also appreciate that the present invention is not limited to only the embodiments described. Persons skilled in the art will also appreciate that the apparatus of the present invention may be implemented in other ways than those described herein. All such modifications are within the scope of the present invention, which is limited only by the claims that follow.

What is claimed is:

1. A laminated card comprising:
   a board;
   a user interface on the board; and
   a bladder fluidically coupled to the user interface, wherein the bladder is a second user interface on the board.

2. The card of claim 1, wherein the bladder exists in a support structure fixed to the board.

3. The card of claim 1, wherein the user interface is one of a plurality of user interfaces and the bladder is not one of the user interfaces.

4. The card of claim 1, further comprising a dynamic magnetic stripe communications device.

5. The card of claim 1, further comprising:
   a battery; and
   a processor.

6. The card of claim 1, further comprising:
   a display.

7. The card of claim 1, further comprising:
   a top exterior layer;
   a laminate material; and
   a bottom exterior layer, wherein the laminate material, board, user interface, and bladder exist between the top and bottom exterior layers.

8. A laminated card comprising:
a printed circuit board;
a user interface mounted to the printed circuit board; and
a bladder fluidically coupled to the user interface, wherein the bladder is a second user interface mounted to the printed circuit board.

9. The card of claim 8, further comprising a dynamic magnetic stripe communications device.

10. The card of claim 8, further comprising:
a battery; and
a processor.

11. The card of claim 8, further comprising:
a display.

12. The card of claim 8, further comprising:
a top exterior layer;
a laminate material; and
a bottom exterior layer, wherein the laminate material, printed circuit board, user interface, and bladder exist between the top and bottom exterior layers.

13. The card of claim 8, wherein said printed circuit board is flexible.

14. A laminated card comprising:
a printed circuit board;
a user interface mounted to the printed circuit board; and
a bladder fluidically coupled to the user interface, wherein the bladder is a false user interface.

15. The card of claim 14, further comprising a dynamic magnetic stripe communications device.

16. The card of claim 14, further comprising:
a battery; and
a processor.

17. The card of claim 14, further comprising:
a display.

18. The card of claim 14, further comprising:
a top exterior layer;
a laminate material; and
a bottom exterior layer, wherein the laminate material, printed circuit board, user interface, and bladder exist between the top and bottom exterior layers.

19. The card of claim 14, wherein said printed circuit board is flexible.

20. A laminated card comprising:
a printed circuit board;
a user interface mounted to the printed circuit board;
a bladder fluidically coupled to the user interface; and
a conduit for fluidically connecting the user interface and the bladder.

21. The card of claim 20, further comprising a dynamic magnetic stripe communications device.

22. The card of claim 20, further comprising:
a battery; and
a processor.

23. The card of claim 20, further comprising:
a display.

24. The card of claim 20, further comprising:
a top exterior layer;
a laminate material; and
a bottom exterior layer, wherein the laminate material, printed circuit board, user interface, and bladder exist between the top and bottom exterior layers.

25. The card of claim 20, wherein said printed circuit board is flexible.

26. A laminated card comprising:
a printed circuit board;
a user interface mounted to the printed circuit board;
a bladder fluidically coupled to the user interface; and
a step structure fixed to the printed circuit board and a conduit for fluidically connecting the user interface and the bladder, wherein the user interface comprises a dual layer user interface having inner and outer layers, the outer layer mounted to a tier structure, and wherein the conduit exists in the step structure.

27. A laminated card comprising:
a printed circuit board;
a user interface mounted to the printed circuit board; and
a bladder fluidically coupled to the user interface, wherein the user interface is one of a plurality of user interfaces, and each user interface is fluidically coupled to the bladder.

28. A laminated card comprising:
a printed circuit board;
a user interface mounted to the printed circuit board; and
a bladder fluidically coupled to the user interface, wherein the user interface is one of a plurality of user interfaces and any one of the user interfaces is operative to function as the bladder.

29. The card of claim 28, further comprising a dynamic magnetic stripe communications device.

30. The card of claim 28, further comprising:
a battery; and
a processor.

31. The card of claim 28, further comprising:
a display.

32. The card of claim 28, further comprising:
a top exterior layer;
a laminate material; and
a bottom exterior layer, wherein the laminate material, printed circuit board, user interface, and bladder exist between the top and bottom exterior layers.

33. The card of claim 28, wherein said printed circuit board is flexible.

34. A laminated card comprising:
a board;
a user interface on the board; and
a bladder fluidically coupled to the user interface, wherein the bladder is a false user interface.

35. The card of claim 34, further comprising a dynamic magnetic stripe communications device.

36. The card of claim 34, further comprising:
a battery; and
a processor.

37. The card of claim 34, further comprising:
a display.

38. The card of claim 34, further comprising:
a top exterior layer;
a laminate material; and
a bottom exterior layer, wherein the laminate material, board, user interface, and bladder exist between the top and bottom exterior layers.

39. A laminated card comprising:
a board;
a user interface on the board;
a bladder fluidically coupled to the user interface; and
a conduit for fluidically connecting the user interface and the bladder.

40. The card of claim 39, further comprising a dynamic magnetic stripe communications device.

41. The card of claim 39, further comprising:
a battery; and
a processor.

42. The card of claim 39, further comprising:
a display.

43. The card of claim 39, further comprising:
a top exterior layer;
a laminate material; and
a bottom exterior layer, wherein the laminate material, board, user interface, and bladder exist between the top and bottom exterior layers.

44. A laminated card comprising:
a board;
a user interface on the board;
a bladder fluidically coupled to the user interface; and
a step structure fixed to the board and a conduit for fluidically connecting the user interface and the bladder, wherein the user interface comprises a dual layer user interface having inner and outer layers, the outer layer mounted to a tier structure, and wherein the conduit exists in the step structure.

45. A laminated card comprising:
a board;
a user interface on the board; and
a bladder fluidically coupled to the user interface, wherein the user interface is one of a plurality of user interfaces, and each user interface is fluidically coupled to the bladder.

46. The card of claim 45, further comprising a dynamic magnetic stripe communications device.

47. The card of claim 45, further comprising:
a battery; and
a processor.

48. The card of claim 45, further comprising:
a display.

49. The card of claim 45, further comprising:
a top exterior layer;
a laminate material; and
a bottom exterior layer, wherein the laminate material, board, user interface, and bladder exist between the top and bottom exterior layers.

50. A laminated card comprising:
a board;
a user interface on the board; and
a bladder fluidically coupled to the user interface, wherein the user interface is one of a plurality of user interfaces and any one of the user interfaces is operative to function as the bladder.

51. The card of claim 50, further comprising a dynamic magnetic stripe communications device.

52. The card of claim 50, further comprising:
a battery; and
a processor.

53. The card of claim 50, further comprising:
a display.

54. The card of claim 50, further comprising:
a top exterior layer;
a laminate material; and
a bottom exterior layer, wherein the laminate material, board, user interface, and bladder exist between the top and bottom exterior layers.

* * * * *